J. D. LUTTRELL.
ACETYLENE LAMP.
APPLICATION FILED FEB. 26, 1917.

1,302,393.

Patented Apr. 29, 1919.
2 SHEETS—SHEET 1.

Witnesses:

Inventor
John D. Luttrell
By Hill & Hill
Attys:

J. D. LUTTRELL.
ACETYLENE LAMP.
APPLICATION FILED FEB. 26, 1917.
1,302,393.
Patented Apr. 29, 1919.
2 SHEETS—SHEET 2.
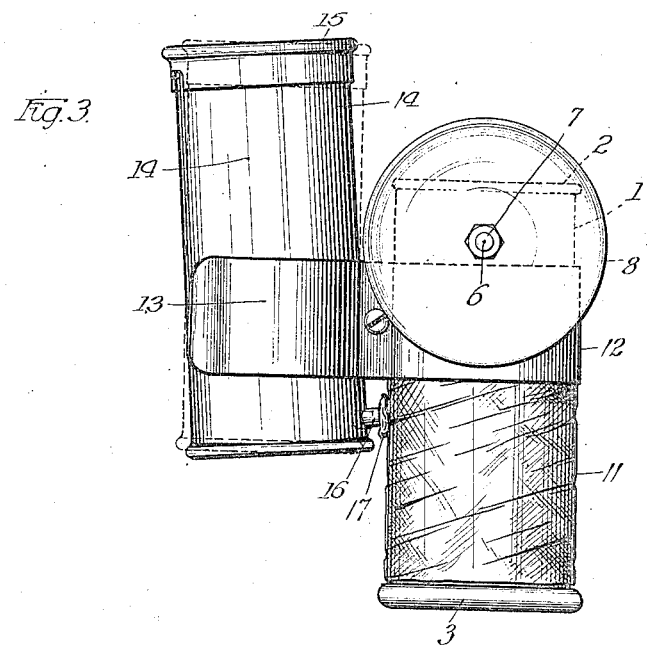
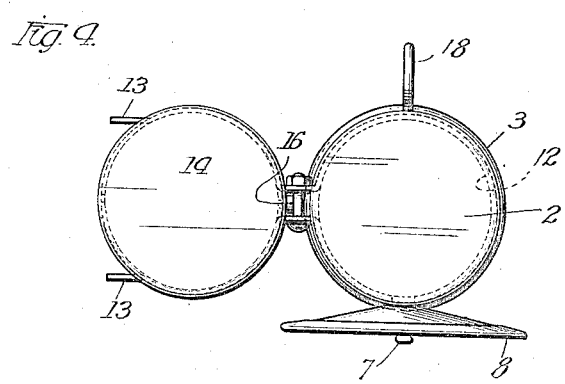
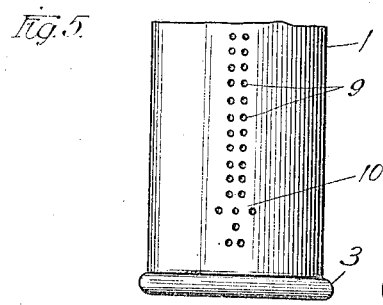

UNITED STATES PATENT OFFICE.

JOHN D. LUTTRELL, OF BENTON HARBOR, MICHIGAN.

ACETYLENE-LAMP.

1,302,393. Specification of Letters Patent. Patented Apr. 29, 1919.

Application filed February 26, 1917. Serial No. 151,085.

*To all whom it may concern:*

Be it known that I, JOHN D. LUTTRELL, a citizen of the United States, residing at Benton Harbor, Berrien county, State of Michigan, have invented certain new and useful Improvements in Acetylene-Lamps, of which the following is a description.

My invention belongs to that general class of devices in which the calcium carbid and the necessary water to coöperate therewith are positioned in separate compartments, in proximity to one another, with suitable means for controlling the feed of the water to the carbid, as desired, to control the operation of the lamp. It has for its object a process of automatically supplying just enough liquid to secure the best results, and the production of a simple, economical and practical device of the class described, which may be constructed at low cost, and at the same time is practical, reliable and durable in its operation. To this end it consists in the process set forth and the novel construction, arrangement and combination of parts herein shown and described, and more particularly pointed out in the claims.

In the drawings, wherein like reference characters indicate like or corresponding parts, Figure 1 is a central vertical section through both chambers of a lamp embodying my improvement;

Fig. 3 is a side elevation of the device, showing the same in one of its modified or adjusted positions;

Fig. 4 is a top plan view of the device, and

Fig. 5 is a fragment of one face of the carbid chamber showing the construction.

Figure 1:
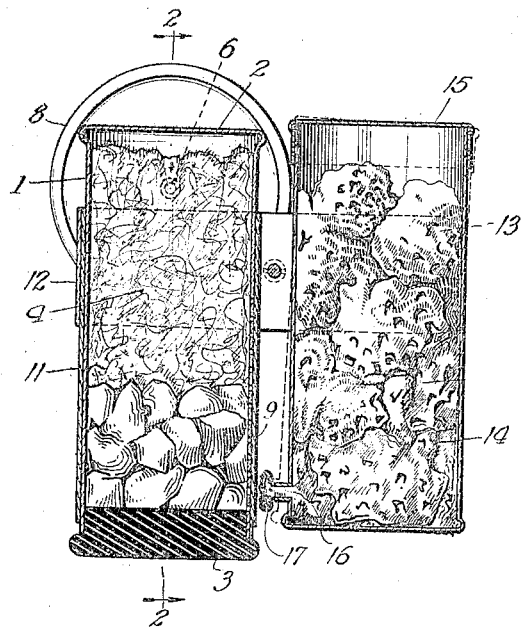
Figure 2:
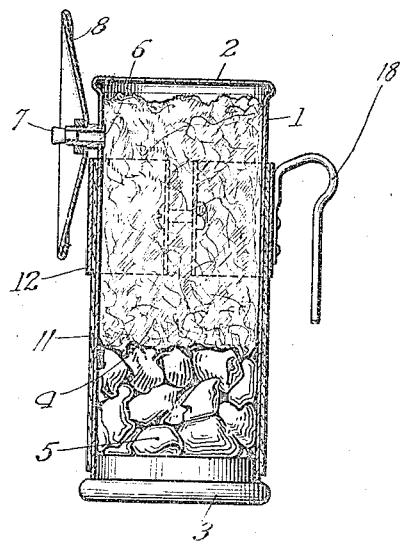
Fig. 2 is a vertical section thereof, taken at right angles to Fig. 1, on line 2—2 of Fig. 1.

As shown in the drawings, 1 is a suitable carbid chamber provided with a closed top 2, and an open bottom closed with a suitable stopper 3 of rubber or other preferred material. Any suitable filtering material is positioned in the upper part of the receptacle, and being pervious, may substantially fill the same. The filtering material is indicated by the numeral 4. The space below the filtering material is occupied by the carbid 5. Near the upper part of the chamber a suitable gas aperture 6 is provided, through which the gas may escape, equipped with a proper tip 7, and if desired, with a reflector 8. On one face, preferably at right angles to the burner or tip 7, a portion of the wall of the chamber is perforated with a series of small openings, as at 9. (Figs. 1 and 5). These perforations are preferably arranged in a vertical manner, as indicated, and at one or more points may be increased, as at 10. The outer surface of the receptacle, at the point of the perforations, and preferably extending upward to substantially the top of the chamber, is covered with an absorbent material, such as butcher's linen, or equivalent material, and for convenience in manufacturing, the lower part of the chamber, as indicated, may be wrapped with such material as indicated at 11. If desired, at the point of the perforations this material may be increased by padding the same, or placing one or more layers of such material beneath the general wrapping 11.

This chamber is provided with a suitable collar 12 embracing the same near the top, and provided with coacting, extending arms 13, or equivalent means, adapted to embrace and retain in place a coöperating liquid chamber 14. This liquid chamber is preferably substantially the same size as a carbid chamber, for convenience and for balancing the device when it is carried, and is provided with a closure 15 for the top thereof, and an outlet 16 near the bottom.

It is filled to a greater or lesser extent with an absorbent material 16, such for example as sponge, absorbent cotton, or equivalent material for the purpose, and has extending through the outlet 16 a suitable material such as a wick or a portion of the absorbent cotton or sponge, adapted by capillary action to convey and feed the fluid from the water chamber 14 through the opening 16. This water chamber is placed in such position that the feed opening 16 is adjacent to and registers with the apertured portion 9 in the carbid chamber. The arms 13 so support the liquid chamber that it may be given a slight oscillating motion therein, so that the lower portion of the liquid chamber may be moved toward or from the carbid chamber, as indicated. A suitable hook or supporting device 18 may be provided to attach the lamp to a miner's cap or to other suitable support. Obviously, the burner may be positioned in the top of the carbid chamber, if desired, and a suitable protection be provided therefor for the ordinary purposes of a lamp.

The mode of operation is exceedingly simple. The carbid chamber is charged and the closure 3 placed in position. The liquid chamber may then be removed from the arms 13, if preferred, and its top being removed, be suitably charged with liquid, preferably only to the point of saturating the absorbent material therein. The liquid chamber is then pressed between the resilient arms 13, when the device is ready for use. Upon swinging the lower portion of the liquid chamber toward the carbid chamber, the feeding material 17 contacts with the absorbent material covering the apertures 9, and the liquid is thus gradually and regularly passed into carbid, finely distributed, as it necessarily will be by this process. The carbid immediately takes up this liquid in sufficient quantity to bring about the desired chemical action, and the gas passes upward through the filtering material and out through the burner. If the release of the gas is too rapid for the purpose desired, the pressure of the feeding body 17 upon the carbid chamber may be relieved by moving the bottom of the liquid chamber away slightly, thus decreasing the feed of the liquid and retarding the generation of gas. Moving the bottom of the liquid chamber a sufficient distance to separate the feeding device from the face of the carbid chamber, stops the feeding of the liquid, and the action of the lamp ceases. It will be seen that complete control in the simplest possible manner is thus secured without the employment of valve mechanism. To thoroughly exhaust the carbid, the liquid chamber may be readily moved up and down in the supporting arms 13, thus applying the feeding member 17 at different points upon the perforated portion of the carbid chamber, as indicated in Fig. 3, and insuring the complete exhaustion of the carbid. At the same time the capillary action causes the moisture to be distributed throughout the covering in a manner serving to keep the chamber cool, somewhat similar to a water jacket. Evaporation of the said moisture materially aids in the cooling operation and also the moisture distributed throughout the covering acts to prevent the escape of gas from the perforations 9, somewhat in the manner of a water seal.

For a miner's lamp the device described is effective in practical operation to secure results stated. For devices in which larger quantities of carbid are charged, any suitable means may be employed to present the fluid in the manner described in sufficient quantities to effectively exhaust the entire charge of carbid. The spent carbid does not cake, cement or crust to any appreciable extent as when the fluid is supplied to the carbid in drops or by gravity, but is in finely powdered form, which is readily removed from the container.

It will be seen that my improved process consists in bringing the fluid in contact with the carbid by capillary attraction in such manner that it is not dropped or showered thereon, but the carbid automatically appropriates and takes up just the quantity effective to release the gas. The cooling jacket action is also effective for the purpose stated and the flame is clear and white, in marked distinction to the yellow flame when the gas is delivered to the burner at a high temperature.

Practical use of this device over a considerable period shows that it is very effective in operation. The gas in the carbid is liberated in a thoroughly practical and efficient manner, the light is clear and bright, and the usual incrustation found in such devices is practically eliminated. The device being valveless, and readily understood, is effectively handled by any one, even though they have no practical knowledge of the general uses of carbid or acetylene devices.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:—

1. A device of the kind described, comprising a carbid chamber provided with a burner near the upper part thereof, and a closure for the chamber, said chamber having formed therein one or more apertures, and absorbent material covering said apertures, in combination with a coöperating fluid chamber adjustably supported near the carbid chamber, and provided with an aperture near the bottom thereof, and suitable permeable material controlling said aperture, whereby upon bringing the feed opening of the fluid chamber in contact with the carbid chamber, fluid will be conducted to the carbid substantially as described.

2. A device of the kind described, comprising a carbid chamber provided near its top with a suitable burner, and with a suitable closure for the chamber, said carbid chamber having formed in the wall thereof a series of apertures, absorbent material covering said apertures, a collar carried by said chamber, and provided with an extending supporting part, in combination with a cooperating fluid chamber arranged to be supported by said part in adjustable relation to the carbid chamber, said chamber provided with a feed opening 16, and permeable feeding material 17 positioned therein, and suitable absorbent material positioned in said chamber, substantially as and for the purpose set forth.

In testimony whereof, I have hereunto signed my name in the presence of two subscribing witnesses.

JOHN D. LUTTRELL.

Witnesses:
 JOHN W. HILL,
 CHARLES I. COBB.